(12) United States Patent
Matsuda et al.

(10) Patent No.: US 7,431,337 B2
(45) Date of Patent: Oct. 7, 2008

(54) INFLATOR FOR AN AIR BAG

(75) Inventors: Naoki Matsuda, Himeji (JP); Takao Kuroda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 360 days.

(21) Appl. No.: 11/055,515

(22) Filed: Feb. 11, 2005

(65) Prior Publication Data

US 2005/0189754 A1    Sep. 1, 2005

(30) Foreign Application Priority Data

Feb. 12, 2004    (JP) .............................. 2004-035352

(51) Int. Cl.
*B60R 21/26*    (2006.01)
(52) U.S. Cl. ...................... 280/741; 280/737; 280/742; 102/202
(58) Field of Classification Search ................ 280/737, 280/741, 736, 742; 102/202, 202.5, 202.7, 102/202.9, 202.14, 202.12
See application file for complete search history.

(56) References Cited

U.S. PATENT DOCUMENTS

| | | | |
|---|---|---|---|
| 4,077,423 A | | 3/1978 | Kasagi et al. |
| 5,821,446 A | * | 10/1998 | Chatley, Jr. ............... 102/202.7 |
| 6,244,622 B1 | * | 6/2001 | Al-Amin et al. ............ 280/737 |
| 6,272,992 B1 | * | 8/2001 | Chatley, Jr. ............... 102/202.5 |
| 6,295,935 B1 | * | 10/2001 | Swann et al. ................ 102/530 |
| 6,338,500 B1 | * | 1/2002 | Perotto ........................ 280/741 |
| 6,796,245 B2 | * | 9/2004 | Parker et al. ................ 102/530 |
| 6,820,556 B1 | * | 11/2004 | Oda ........................ 102/202.7 |
| 6,848,713 B2 | * | 2/2005 | Nakashima et al. ......... 280/741 |
| 6,979,021 B2 | * | 12/2005 | Young et al. ................ 280/737 |
| 7,004,071 B2 | * | 2/2006 | Avetisian et al. ......... 102/202.7 |
| 7,125,041 B2 | * | 10/2006 | Kato et al. .................. 280/736 |
| 7,210,703 B2 | * | 5/2007 | Young et al. ................ 280/741 |

FOREIGN PATENT DOCUMENTS

| | | |
|---|---|---|
| EP | 1217325 A1 | 6/2002 |
| JP | 2003-161599 A | 6/2003 |
| WO | WO-03/022645 A1 | 3/2003 |

* cited by examiner

*Primary Examiner*—Toan C To
(74) *Attorney, Agent, or Firm*—Birch, Stewart, Kolasch & Birch, LLP

(57) ABSTRACT

An inflator for an air bag which can be assembled easily is provided. An igniter 30 is fixed inside a closure 20 using a resin 28 by charging molten resin through a resin charging hole 24 provided in the closure 20, and hardening the resin. The closure 20 is fixed to an inflator housing 12 by welding at a connecting portion 18. Since the number of components and the number of steps are smaller, favorable assembly workability is achieved.

5 Claims, 3 Drawing Sheets

INFLATOR FOR AN AIR BAG

BACKGROUND OF THE INVENTION

1. Field of the Invention

The present invention relates to an igniter assembly, an inflator for an air bag, and an assembly method of an inflator for an air bag.

2. Description of the Related Art

Known inflators for an air bag used in an air bag system for an automobile include those using an air bag inflation medium constituted by combustion gas generated by combustion of a gas generating agent, an air bag inflation medium constituted by pressurized gas charged into a housing, and an air bag inflation medium constituted by both combustion gas and pressurized gas. However, all of these types invariably comprise an igniter.

When assembling a conventional inflator, a method of fixing an igniter to a metallic igniter collar and then fixing the igniter collar to an inflator housing is typically employed. In cases where the igniter is fixed to an igniter collar, a method of performing the fixing operation using resin is known. In U.S. Pat. No. 4,077,423, a method of fixing an igniter 3 into a cock 2 using a retainer formed from styrene rubber or gum is disclosed.

SUMMARY OF THE INVENTION

In the background art, when an igniter is fixed to an inflator housing, problems such as the large number of components, the large number of assembly steps, poor workability, and so on arise.

DISCLOSURE OF THE INVENTION

An object of the present invention is to provide an igniter assembly in which an igniter can be attached securely by a simple method, an inflator for an air bag using this igniter assembly, and an assembly method of an inflator for an air bag.

As a means for solving the problems described above, a first aspect of the present invention provides an igniter assembly comprising an igniter and a housing or closure accommodating the igniter, wherein the igniter is surrounded by an inner wall surface of the housing or closure provided in the vicinity of the igniter, and is fixed directly to the inner wall surface by a resin.

By fixing the igniter within the housing or closure using a resin, the number of components and steps is reduced, and hence workability is improved. Particularly since the resin is charged into the housing or closure, the resin does not leak outside of the housing or closure, thereby facilitating the resin charging operation.

Further, since, in this type of igniter assembly, the igniter is surrounded by the housing or closure, the igniter assembly can be moved easily to a subsequent step in the inflator assembly process, and can also be stored and transported easily, such that even if the igniter assembly collides with another object, the igniter is protected by the surrounding closure, and thus can be preferably protected from damage.

Note that the igniter (electric igniter) comprises an ignition portion provided with a priming and a electroconductive pin, and therefore in order to activate the igniter normally, part of the electroconductive pin is not covered by the resin.

In the igniter assembly of the present invention, part of the housing where an igniter is accommodated or the closure preferably includes a charging hole for charging the resin from outside.

By providing such a resin charging hole, molten resin can be charged through the charging hole, improving the workability of the charging operation. A single charging hole is sufficient, but two or more charging holes may be provided such that the resin is charged through the two or more charging holes. Note that the charging hole is closed by the charged resin.

In the igniter assembly of the present invention, the ignition portion positioned on the tip end of the igniter may be covered completely by the resin.

In the present invention, instead of the method of charging molten resin through the resin charging hole provided in the closure, a method of charging molten resin through a gap between the igniter and closure from an opening portion side of the closure may be applied. When this method is applied, it is believed to be easier to cover the ignition portion of the igniter with the resin than when the resin is charged through the resin charging hole. In such cases, the resin acts as an insulating material, and hence the following meritorious effects are obtained.

In cases where a electroconductive cup (made of stainless steel, for example) is used as the ignition portion of the igniter, the electric current may escape into the closure during activation of the igniter if the cup makes contact with the inner wall surface of the closure directly, making it impossible to activate the igniter. However, when the ignition portion of the igniter is covered completely by the resin, the entire igniter is insulated, and hence the current does not escape to the closure side, preventing situations such as that described above from arising.

Note that in order to activate the igniter normally so that the ignition action is not impaired, the thickness of the resin covering the top surface of the ignition portion, on which the priming is disposed, is preferably set at approximately 0.1 to 1 mm.

In the igniter assembly of the present invention, the ignition portion positioned on the tip end of the igniter is preferably surrounded completely by the closure.

When the inflator housing and the closure are fixed together by welding, heat is applied to the connecting part during the welding operation, and hence situations in which the priming on the top surface of the ignition portion of the igniter ignites and burns or the charged resin melts due to conduction of this heat may arise.

However, when the ignition portion is surrounded completely by the closure, the ignition portion top surface and the connecting part can be prevented from being too close, and hence such situations in which the priming ignites and burns or the resin melts in the welding operation applied at the time of assembling a normal inflator are prevented.

As other means for solving the problems described above, a second aspect of the present invention provides an igniter assembly comprising an igniter and a housing or closure accommodating the igniter, wherein the igniter is surrounded by an inner wall surface of the housing or closure provided in the vicinity of the igniter and a cup member attached to the housing or closure, and is fixed directly to the inner wall surface by a resin.

The cup member is formed from a metal with good pressure resistance, and comprises a ceiling surface and a side surface (preferably a peripheral surface). The surface facing the ceiling surface is open, and the cup member is placed onto the igniter from the opening portion side and then fixed to the housing or closure. Further, the cup member preferably includes a flange portion on the peripheral edge of the opening portion to facilitate fixing to the housing or closure.

In the present invention, the igniter is surrounded by the inner wall surface of the housing or closure and the cup member, and hence the same actions and effects as the first aspect of the invetion are obtained. Thus in the present invention, the igniter need not be surrounded completely by the inner wall surface of the housing or closure, and instead may be partially surrounded by the inner wall surface of the housing or closure, having the remaining part surrounded by the cup member.

The present invention may be constituted such that only part of the igniter is surrounded by the housing or closure, and therefore the resin charging operation is easier than when the entire igniter is surrounded by the housing or closure. Accordingly, the part of the housing where an igniter is accommodated or the closure need not include a charging hole for charging the resin from the outside.

Note that when applied to an inflator which uses a pressurized gas as the air bag inflation medium, the cup member serves as a rupturable plate maintaining an airtight state.

As other means for solving the problems described above a third aspect of the present invention, an invention in claim 6 provides an inflator for an air bag in which an igniter is accommodated in a housing or a closure attached to the housing, wherein the igniter is surrounded by an inner wall surface of the housing or closure provided in the vicinity of the igniter, and is fixed directly to the inner wall surface by a resin.

Both the housing and closure are made of metal, and hence it goes without saying that the melting point of this metal is considerably higher than the melting temperature of the resin.

By fixing the igniter within the housing or the closure attached to the housing using resin, the number of components and the number of steps are reduced, enabling improved workability. Moreover, the same actions and effects as the first aspect of the invention are obtained.

Note that the igniter (electric igniter) comprises an ignition portion provided with a priming and a electroconductive pin, and therefore in order to operate the igniter normally, part of the electroconductive pin is not covered by the resin.

In the inflator for an air bag of the present invention, the part of the housing where an igniter is accommodated or the closure preferably includes a charging hole for charging the resin from outside.

By providing such a resin charging hole, molten resin can be charged through the charging hole, improving the workability of the charging operation. A single charging hole is sufficient, but two or more may be provided such that the resin is charged through the two or more charging holes. Note that the charging hole is closed by the charged resin.

In the inflator for an air bag of the present invention, the ignition portion positioned on the tip end of the igniter may be covered completely by the resin. In so doing, the resin exhibits an insulating action, as described above, and situations in which a normal operation of the igniter is impaired do not arise.

In the inflator for an air bag of the present invention, the part of the housing where an igniter is accommodated or the closure preferably comprises a protruding portion protruding inwardly from the inner wall surface. A gap in the width direction, which is narrowed by the presence of the protruding portion, is preferably set to be smaller than the width of the ignition portion (the part provided with the priming) of the igniter, and the electroconductive pin of the igniter is preferably positioned in the position of the protruding portion.

The protrusion may be an annular protrusion, or may be a single or a plurality of independent protrusions. When a plurality of independent protrusions is provided, all of the protrusions are preferably positioned equidistant from the opening portion. By means of this protruding portion, the igniter is prevented from moving past the protruding portion in the axial direction.

Further, when the igniter is activated, the heat generated as a result may cause the resin to melt from the part near the ignition portion such that the igniter becomes detached and flies outward. However, by providing the protruding portion, the ignition portion of the igniter invariably catches on the protruding portion, thus being prevented from shifting axially and becoming detached.

The present invention provides an inflator for an air bag in which the housing or closure is a cylindrical member and the cylindrical closure is connected to an opening portion on one end side of the cylindrical housing.

The cylindrical housing and cylindrical closure preferably have the same diameter so that workability is favorable when the two members are connected by welding or the like.

As other means for solving the problems described above, a fourth aspect of the present invention provides an inflator for an air bag in which an igniter is accommodated in a housing or closure attached to the housing, wherein the igniter is surrounded by an inner wall surface of the housing or closure provided in the vicinity of the igniter and a cup member attached to the housing or closure, and is fixed directly to the inner wall surface by a resin.

Both the housing and closure are made of metal, and hence it goes without saying that the melting point of the metal is considerably higher than the melting temperature of the resin. The igniter (electric igniter) comprises an ignition portion provided with a priming and a electroconductive pin, and therefore in order to operate the igniter normally, part of the electroconductive pin is not covered by the resin.

The cup member is made of a metal with good pressure resistance, and comprises a ceiling surface and a side surface (preferably a peripheral surface). The surface facing the ceiling surface is open, and the cup member is placed onto the igniter from the opening portion side and then fixed to the housing or closure. Further, the cup member preferably includes a flange portion on the peripheral edge of the opening portion to facilitate fixing to the housing or closure.

By employing the cup member, the present invention obtains the same actions and effects as the second aspect of the invention. Note that when the inflator uses pressurized gas as an air bag inflation medium, the cup member serves as a rupturable plate maintaining an airtight state. Hence the cup member facing the igniter preferably comprises a fragile portion which is capable of maintaining an airtight state, and which ruptures easily when the igniter is activated.

As other means for solving the problems described above, a fifth aspect of the invention provides a method of assembling an inflator for an air bag comprising the steps of: inserting an igniter into a cylindrical closure; charging a molten resin into at least an interior space of the cylindrical closure through a resin charging hole provided in a side wall of the cylindrical closure, and hardening the molten resin such that the igniter is fixed to an inner wall surface of the cylindrical closure; and fixing an igniter assembly, in which the igniter is fixed to the cylindrical closure, to an opening portion on one end of a cylindrical housing.

By applying such an assembly method, the number of components and steps is reduced, and by using the resin charging hole, the workability, including that of the resin charging operation, is improved greatly. Moreover, the same actions and effects as those of the first and second aspects of the invention are obtained. Note that the igniter (electric igniter) comprises an ignition portion provided with a priming and a electroconductive pin, and therefore in order to operate the igniter normally, part of the electroconductive pin is not covered by the resin when the resin is charged.

The interior space for charging the resin is the space between the cylindrical closure and the igniter, but the resin is also charged through the charging hole. Note that when charging the resin, a die for limiting movement of the resin may be used to prevent the resin from adhering to the top surface of the ignition portion of the igniter. On page 14, paragraph beginning on line 2

The inflator that is obtained when this assembly method is applied exhibits the same actions and effects as the that of the third aspect of the invention.

Further, to facilitate connection of the electroconductive pin of the igniter to a connector connected to a lead wire, an appropriate die may be used in the resin charging step to form a space (for inserting the connector) of a predetermined shape over the interior and exterior of the cylindrical closure. The resin may then be charged to form this space.

Note that when the inflator uses a cup member, a step of fixing the cup member to the cylindrical closure is added after the step of fixing the igniter to the inner wall surface of the cylindrical closure.

Preferably, in the step of inserting the igniter into the cylindrical closure in the assembly method of the inflator for an air bag of the present invention, a cylindrical closure having an annular protrusion or a plurality of independent protrusions on an inner peripheral surface thereof, in which an inner diameter of the annular protrusion or a interval of the plurality of protrusions in the radial direction is set to be smaller than that of an ignition portion of the igniter, is preferably used as the cylindrical closure, such that when the igniter is inserted from an opening portion side on another end of the cylindrical closure, an electroconductive pin is placed in the position of the annular protrusion or plurality of protrusions.

The inflator that is obtained when this assembly method is applied exhibits the same actions and effects as the invention in claim 6.

In the step of inserting the igniter into the cylindrical closure in the assembly method of the inflator for an air bag of the present invention, the igniter is preferably inserted such that the top surface of the ignition portion of the igniter is surrounded by the cylindrical closure.

When the inflator housing and the cylindrical closure are fixed together by welding, heat is applied to the connecting part during the welding operation, and as a result of conduction of this heat, the priming on the top surface of the ignition portion of the igniter may ignite and burn, or the resin may melt.

However, by providing a gap between the ignition portion top surface of the igniter and the opening portion of the cylindrical closure so that the ignition portion and cylindrical closure are not too close, situations in which the priming ignites and burns or the resin melts when performing welding at the time of assembling a normal inflator are prevented.

In the inflator for an air bag, and the inflator produced by the assembly method, of the present invention, the inflation medium of the air bag may be a combustion gas generated by combustion of a gas generating agent, a pressurized gas charged into the housing, or both a combustion gas and a pressurized gas.

The inflator for an air bag of the present invention comprises less components and less assembly steps, and moreover, resin may be charged through the resin charging hole. As a result, the assembly operation is simple, and workability is favorable.

DETAILED DESCRIPTION OF THE INVENTION (1) Inflator for an Air Bag

Figure 1:
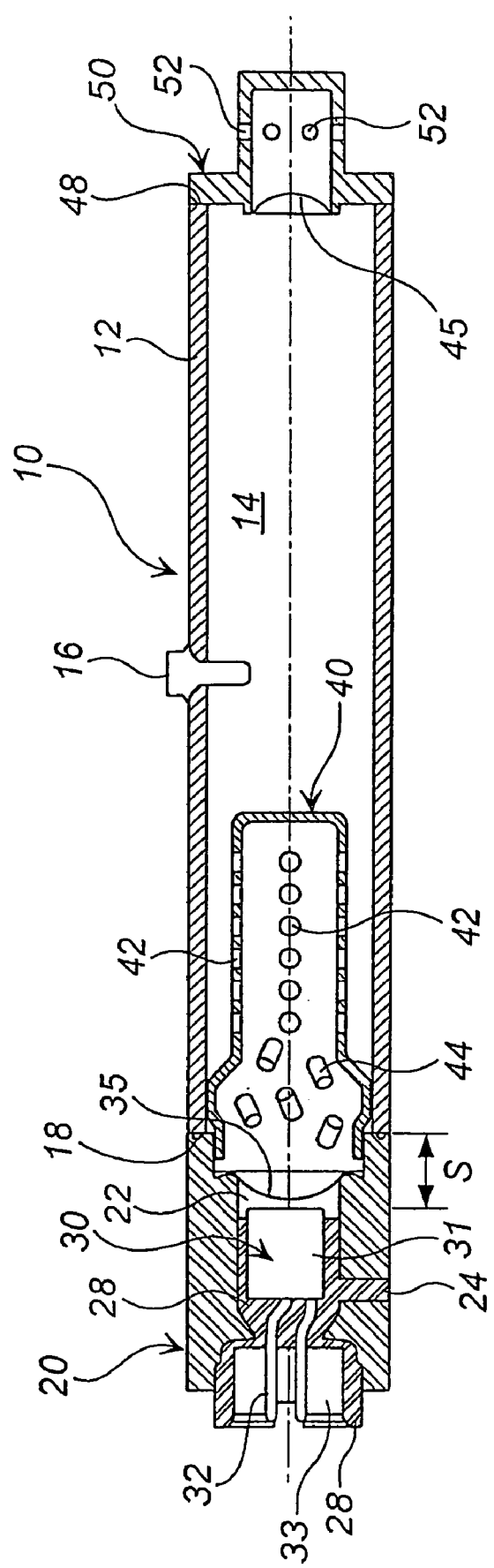
FIG. 1 is a vertical cross-sectional view of an inflator for an air bag of the present invention.
Figure 2:
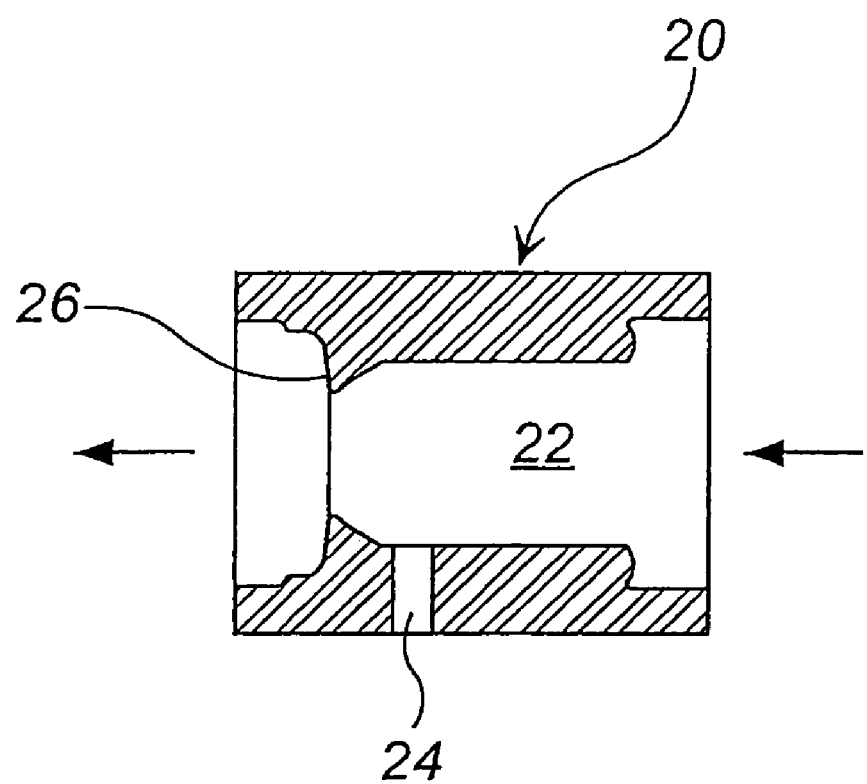
FIG. 2 is a vertical cross-sectional view of a cylindrical closure in FIG. 1.

Embodiments of the present invention will be described below using the drawings. FIG. 1 is a vertical cross-sectional view of an inflator for an air bag comprising an igniter assembly, and FIG. 2 is a vertical cross-sectional view of a cylindrical closure in FIG. 1. Note that the inflator for an air bag in FIG. 1 is a hybrid inflator in which a pressurized gas is used as an air bag inflation medium.

An outer shell of an inflator 10 comprises a cylindrical inflator housing 12, a cylindrical closure 20 fixed by welding to an opening portion side on one end of the inflator housing 12, and a diffuser 50 fixed by welding to the other end of the housing 12.

The inflator housing 12 is preferably made of steel having high pressure resistance, whereas the closure 20 may be made of steel, aluminum, or stainless steel. The inflator housing 12 and closure 20 have an equal outer diameter.

A gas such as nitrogen gas, argon gas, or helium gas is charged at high pressure into an interior space 14 in the inflator housing 12. A pin 16 closes a charging hole for gas, and is welded to the inflator housing 12.

The igniter assembly comprises the closure 20 and an igniter 30 which is fixed into an interior space (igniter accommodating chamber) 22 of the closure 20 by a resin 28. The igniter 30 is surrounded by an inner wall surface of the closure 20 such that the igniter 30 and inner wall surface are positioned in proximity to each other. The inflator housing 12 and closure 20 are fixed to each other by welding at a connecting portion 18. Alternatively, the two members may be screwed together.

A resin charging hole 24 penetrating a peripheral wall of the closure 20 to reach the interior space 22 is provided in the peripheral wall. During assembly, molten resin is charged through the resin charging hole 24. Note that the closure 20 having no resin charging hole 24 may be also used. In this case, molten resin is charged into the gap between the inner wall surface of the closure 20 and the igniter 30 from the opening portion side of the closure 20.

An annular protrusion 26 is provided on the inner wall surface of the closure 20. The inner diameter of the annular protrusion 26 is set to be smaller than the outer diameter of an ignition portion 31 of the igniter 30 so that the igniter 30 never pass through the annular protrusion 26, nor does move in the axial direction (the direction shown by the arrow in FIG. 2) to fly out from the closure 20.

The igniter 30 comprises the ignition portion 31 (provided with a priming on its top surface) and two electroconductive pins 32, and is fixed with the resin 28 interposed between the igniter 30 and the inner wall surface of the closure 20. By interposing the resin 28 in this manner, the igniter 30 is fixed, and an insulating property is secured such that at the time of activation of the igniter 30, an ignition current that is passed through the electroconductive pins 32 does not escape into the closure 20. As a result, a reliable operation is secured.

A part of the resin 28 protrudes from one end face of the closure 20 to form an insertion space 33 for a connector to be connected to the two electroconductive pins 32. As shown in the drawing, the top surface of the ignition portion 31 of the igniter 30 and part of the two electroconductive pins 32 are not covered by the resin 28. However, to increase the insulating property of the igniter 30 for the reasons described above, the top surface of the ignition portion 31 may be covered by the resin 28 (the thickness of the resin is approximately 0.1 to 1 mm).

The closure 20 is sufficiently long to ensure that the opening portion (connecting portion 18) on one end of the closure 20 and the top surface of the ignition portion 31 of the igniter 30 are not too close. The interval between the top surface of the ignition portion 31 and the connecting portion 18 (S in FIG. 1) is preferably set to not less than 3 mm, and more preferably to not less than 5 mm. By adjusting the interval between the top surface of the ignition portion 31 and the connecting portion 18 in this manner, the ignition portion 31 is completely surrounded by the closure 20, and hence such situations are prevented that the priming in the ignition portion 31 ignites and burns or the resin 28 melts due to heat conduction during a welding operation at the connecting portion 18.

The interior space 22 of the closure 20 (the remaining interior space 22 where the resin 28 is not provided) and the interior space 14 of the inflator housing 12 is closed from each other by a first rupturable plate 35 which is fixed to the closure 20 by welding. As a result, no pressurized gas exists inside the interior space 22, and the interior space 22 is kept at normal pressure. Due to the existence of the resin 28, however, the external atmosphere does not pass into the interior space 22.

A cap 40 covering the first rupturable plate 35 is disposed in the inflator housing 12. The required number of vent holes 42 is provided in the peripheral surface of the cap 40, and a gas generating agent 44 is charged into the interior of the cap 40 in a required amount. When the cap 40 is press-inserted into the inflator housing 12, part of the outer peripheral surface of the cap 40 presses against the inner peripheral surface of the inflator housing 12 and the inner peripheral surface of the closure 20, thereby fixing the cap 40. Note that by having the ceiling surface of the cap 40 abutted against the pin 16, it becomes difficult for the cap 40 to shift in the axial direction of the housing, which is desirable.

The interior space 14 of the inflator housing 12 and the diffuser 50 are closed from each other by a second rupturable plate 45 which is fixed to the diffuser 50 by welding. The diffuser 50 comprises the required number of gas discharge ports 52. The diffuser 50 and inflator housing 12 are welded together at a connecting portion 48.

Next, an operation of the inflator for an air bag 10 will be described. When the inflator for an air bag 10 is incorporated into an air bag system of an automobile, the igniter 30 is activated at the time of collision of the vehicle such that the priming in the ignition portion 31 ignites and burns. The ignitability at this time is not diminished even when the top surface of the ignition portion 31 is covered by resin having a thickness of approximately 0.1 to 1 mm.

The resulting ignition energy ruptures the first rupturable plate 35 to ignite and burn the gas generating agent 44 inside the cap 40. A high-temperature gas that is produced by combustion of the gas generating agent 44 causes the pressure in the interior space 14 to rise such that the second rupturable plate 45 is ruptured. When the second rupturable plate 45 ruptures, the pressurized gas and combustion gas inside the interior space 14 pass through the diffuser 50 and are discharged from a gas discharge port 52, thereby inflating the air bag.

During this process, the resin 28 which fixes the igniter 30 to the closure 20 might be melted by the heat that is generated upon activation of the igniter 30. Due to the existence of the annular protrusion 26, however, the igniter 30 does not fly out from the closure 20. Furthermore, in cases where the resin 28 melts, the interior space 14 in the inflator housing 12 may communicate with the external atmosphere. At this point in time, however, air bag inflation has been already completed, and therefore even when such a situation occurs, it causes no problems.

(2) Inflator for an Air Bag

Figure 3:
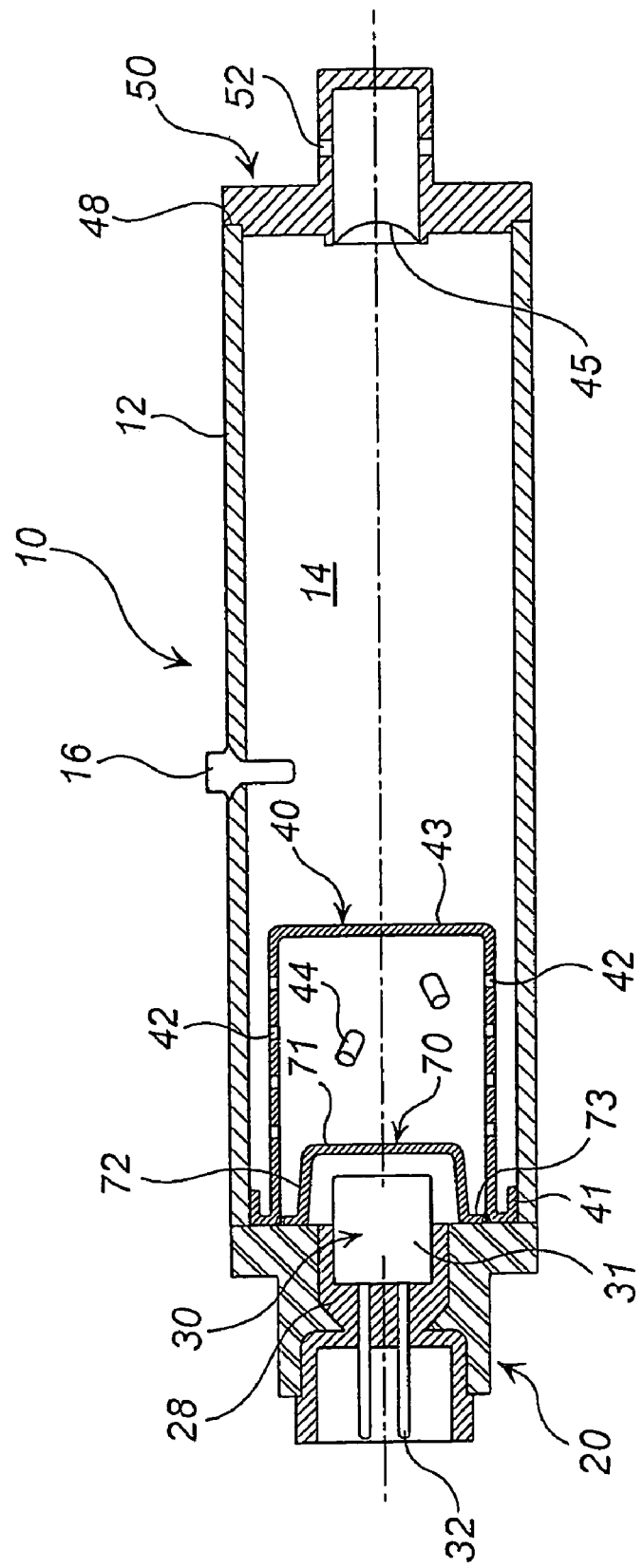
FIG. 3 is a vertical cross-sectional view of another embodiment of the inflator for an air bag of the present invention.

Next, an inflator according to another embodiment will be described with reference to FIG. 3. FIG. 3 is a vertical cross-sectional view of an inflator for an air bag comprising an igniter assembly. Note that the inflator for an air bag in FIG. 3 is a hybrid inflator in which a pressurized gas is used as an air bag inflation medium. The hybrid inflator in FIG. 3 and the hybrid inflator in FIG. 1 have substantially identical structures and perform substantially identical operations, and therefore only differing parts will be described.

Part of the igniter 30 is surrounded by the closure 20, and the resin 28 is charged into the part which is surrounded by the closure 20. The vicinity of the top surface of the igniter 30 (ignition portion 31) protrudes from the closure 20, and the protruding part is surrounded by a cup member 70.

The cup member 70 comprises a ceiling surface 71 and a peripheral surface 72, and is also provided with a flange portion 73 on the peripheral edge of an opening portion thereof. The cup member 70 is fixed to the closure 20 by welding at the flange portion 73 such that the flange portion 73 abuts against the closure 20 to make the cap member 70 envelop the igniter 30 from the opening portion side thereof. By welding the cup member 70 to the closure 20 in this manner, the airtight state of the interior space 14 is secured.

A fragile portion (for example, a shallow cross-shaped notch or a shallow circular notch) is provided in the part of the ceiling surface 71 of the cup member 70 which faces the igniter 30 (ignition portion 31) such that when the igniter 30 is activated, only the fragile portion, or the fragile portion and its vicinity, ruptures or deforms, thus ensuring that the remaining parts of the cup member 70 do not rupture. The fragile portion is preferably set to separate in an integral circular form or to open in a petal form, for example, rather than breaking into small pieces.

The cap 40 is disposed so as to surround the cup member 70. When the cap 40 is press-inserted into the inflator housing 12, a folded-back portion 41 on the peripheral edge of the opening portion of the cap 40 presses against the inner peripheral surface of the inflator housing 12 and the surface of the closure 20, thereby fixing the cap 40. Note that by having a ceiling surface 43 of the cap 40 abut against the pin 16, it becomes difficult for the cap 40 to shift in the axial direction of the housing, which is desirable.

(3) Method of Assembling Inflator for an Air Bag

An embodiment of an assembly method for the inflator for an air bag 10 will now be described using FIGS. 1 and 2.

First, the igniter 30 is inserted into the closure 20 constituted as shown in FIG. 2 from the direction of the arrow. At this time, the igniter 30 is inserted such that the electroconductive pins 32 are disposed in the position of the annular protrusion 26. The interval between the top surface of the ignition portion 31 of the igniter 30 and the opening portion (connecting portion 18) of the closure 20 (S in FIG. 1) is preferably not less than 3 mm, and more preferably not less than 5 mm.

Next, molten resin (nylon 6, 66, 612, or the thermoplastic resin described in JP-A No. 2003-161599) is charged into at least the interior space 22 through the resin charging hole 24 provided in the side wall of the closure 20, and then hardened (the resin 28 denotes the hardened molten resin) such that the igniter 30 is fixed in the closure 20. The insertion space 33 for the connector is formed simultaneously using an appropriate die. Note that when the closure 20 is not provided with the resin charging hole 24, the molten resin is charged into the gap between the closure 20 and igniter 30.

Since the molten resin is charged into the interior of the closure 20 through the resin charging hole 24, the charging operation is simple, and by adjusting the charging amount, the molten resin is prevented from leaking outside of the closure 20. The extent to which the igniter 30 is covered by the resin may be adjusted appropriately, and either a method of not covering the top surface of the ignition portion 31 with the resin, or a method of covering the top surface of the ignition portion 31 with the resin (at a resin thickness of approximately 0.1 to 1 mm) may be applied.

Next, the closure 20 fixed with the igniter 30 (the igniter assembly) is fixed by welding to the connecting portion 18 at the opening portion on one end of the inflator housing 12.

And then, the inflator housing 12 is fixed by welding to the diffuser 50 at the connecting portion 48, whereupon a gas is charged into the inflator housing 12 at high pressure (through the gas charging hole before it is closed by the pin 16 in FIG. 1). The pin 16 is then welded such that the gas charging hole is sealed.

According to the assembly method of the present invention, the number of components and steps can be reduced, and since resin can be charged through the resin charging hole 24, workability is greatly improved.

Note that when assembling the inflator shown in FIG. 3, a step of fixing the cup member 70 to the cylindrical closure 20 by welding at the flange portion 73 is added after the step of fixing the igniter 30 to the inner wall surface of the cylindrical closure 20.

The invention claimed is:

1. An igniter assembly, comprising:

an igniter;

a closure accommodating the igniter, such that the igniter is surrounded by an inner wall surface of the closure, and is fixed directly to the inner wall surface by a resin, the closure having an opening portion provided at one end thereof and the igniter being projected from the opening portion; and a cup member attached to the closure, such that the cup member closes the opening portion and provides an empty space defined by the cup member, the closure, and the resin, thereby isolating the empty space from an outside of the closure.

2. An inflator for an air bag, comprising:

an igniter;

a closure accommodating the igniter, such that the igniter is surrounded by an inner wall surface of the closure, and is fixed directly to the inner wall surface by a resin, the closure having an opening portion provided in one end thereof and the igniter being projected from the opening portion;

a housing attached to the closure; and a cup member attached to the closure, such that the cup member closes the opening portion and provides an empty space defined by the cup member, the closure, and the resin, thereby isolating the empty space from an outside of the closure.

3. The inflator for an air bag according to claim 2, wherein the closure comprises a protruding portion protruding inwardly from the inner wall surface, and defining a gap in a radial direction of the closure, and the gap is smaller than a diameter of an ignition portion of the igniter, wherein an electroconductive pin of the igniter is positioned adjacent to the protruding portion.

4. The inflator for an air bag according to claim 2, wherein the closure is a cylindrical member, and the closure is connected to an opening portion on one end side of the housing.

5. The inflator for an air bag according to claim 2, wherein an inflation medium of the air bag is a combustion gas generated by combustion of a gas generating agent, a pressurized gas charged into the housing, or both the combustion gas and the pressurized gas.

* * * * *